United States Patent
Lu

(10) Patent No.: US 9,848,725 B1
(45) Date of Patent: Dec. 26, 2017

(54) WISHING CARD BINDING STRUCTURE

(71) Applicant: Tsung-Hua Lu, Kaohsiung (TW)

(72) Inventor: Tsung-Hua Lu, Kaohsiung (TW)

(*) Notice: Subject to any disclaimer, the term of this patent is extended or adjusted under 35 U.S.C. 154(b) by 0 days.

(21) Appl. No.: 15/293,305

(22) Filed: Oct. 14, 2016

(51) Int. Cl.
*A47G 33/00* (2006.01)
*F16B 1/00* (2006.01)
*F21V 33/00* (2006.01)
*F21Y 115/10* (2016.01)

(52) U.S. Cl.
CPC .............. *A47G 33/008* (2013.01); *F16B 1/00* (2013.01); *F21V 33/0004* (2013.01); *F16B 2001/0035* (2013.01); *F21Y 2115/10* (2016.08)

(58) Field of Classification Search
CPC . A47G 33/008; F16B 1/00; F16B 2001/0035; F21V 33/0004; F21Y 2115/10
See application file for complete search history.

(56) References Cited

U.S. PATENT DOCUMENTS

| | | | |
|---|---|---|---|
| 2005/0145589 A1* | 7/2005 | Chen | A47F 5/10 211/196 |
| 2010/0290212 A1* | 11/2010 | Francis | G09F 7/04 362/97.3 |
| 2015/0082675 A1* | 3/2015 | Valentine | G09F 15/0012 40/600 |
| 2017/0095073 A1* | 4/2017 | Jackson | A47B 23/00 |

* cited by examiner

*Primary Examiner* — Joseph L Williams
(74) *Attorney, Agent, or Firm* — Leong C. Lei

(57) ABSTRACT

A wishing card binding structure includes: a lighting seat, including a card seat main body, control circuit module and a plurality of light emitting diodes (LEDs), the card seat main body being configured with at least one positioning groove; and a plurality of wishing cards, each being constituted by a card body and second binding element, and said first binding element and second binding element being a magnetic attraction pair capable of attracting each other. Whereby, the wishing card is attracted to and positioned on any position of the first binding element through the second binding element. With the use of the wishing cards, the lighting seat can be modeled more flexibly such that more people can use the wishing cards at the same time, and the appearance of present invention is much more eye-appealing.

6 Claims, 5 Drawing Sheets

WISHING CARD BINDING STRUCTURE

TECHNICAL FIELD OF THE INVENTION

The present invention relates to a wishing card binding structure, and more particularly to a binding structure for positioning wishing cards of blessing nature on a lighting seat.

DESCRIPTION OF THE PRIOR ART

In religion, a light source is produced by burning candles or oil lamps for praying. For example, in Chinese temples, candles and/or oil lamps are burned in front of Buddha to offer in worship, thereby praying for the blessing of gods. In some European and American churches, religious believers also light a small candle holder, hoping their own God or Jesus faith can shine on other people in the world, and at the same time, praying for the blessing of God.

Nowadays, most people use electricity as energy for lighting devices. current general lighting devices are provided with many small partitions, in each of which a small light bulb is turned on to emit light, and a small transparent window configured on the outside thereof is written with a prayer's name directly or attached with a name slip, which is only a simple name marking such that it is not eye-appealing and will be replaced at will by a manager after the use of a period of time.

In addition, small partitions of a conventional lighting device is arranged side by side such that the number thereof is always limited to the wall area or space in a building, and even worse, the poorly located small partitions are not good for users to view.

SUMMARY OF THE INVENTION

To improve a lighting device marking method and display effect, the present invention is proposed.

The main object of the present invention is to provide a wishing card binding structure, making a lighting device marking more convenient and efficient, and displaying much more wishing cards at the same time.

To achieve the object mentioned above, the present invention proposes a wishing card binding structure, including: a lighting seat, including a card seat main body, control circuit module and a plurality of light emitting diodes (LEDs), the card seat main body being configured with at least one positioning groove, a first positioning element being configured inside the positioning groove, and the LEDs being in connection with the control circuit module; and a plurality of wishing cards, each thereof being constituted by a card body and second binding element, and the first binding element and second binding element being a magnetic attraction pair capable of attracting each other. Whereby, the wishing card is attracted to and positioned on any position of the first binding element through the second binding element.

According to the wishing card binding structure mentioned above, the LED is configured inside the positioning groove.

According to the wishing card binding structure mentioned above, the second binding elements are bounded to at least one side of the card body.

According to the wishing card binding structure mentioned above, the second binding element is buried in the card body.

According to the wishing card binding structure mentioned above, the magnetic attraction pair is a permanent magnet arranged in pair with ferromagnetic metal.

According to the wishing card binding structure mentioned above, the magnetic attraction pair is two permanent magnets with different magnetism.

The present invention uses magnetic attraction binding together with the wishing cards to make the modeling designs of the light seat more flexible such that more people can use the wishing cards at the same time, but the appearance of the card seat with the wishing cards is much more eye-appealing.

DETAILED DESCRIPTION OF THE PREFERRED EMBODIMENTS

Figure 1:
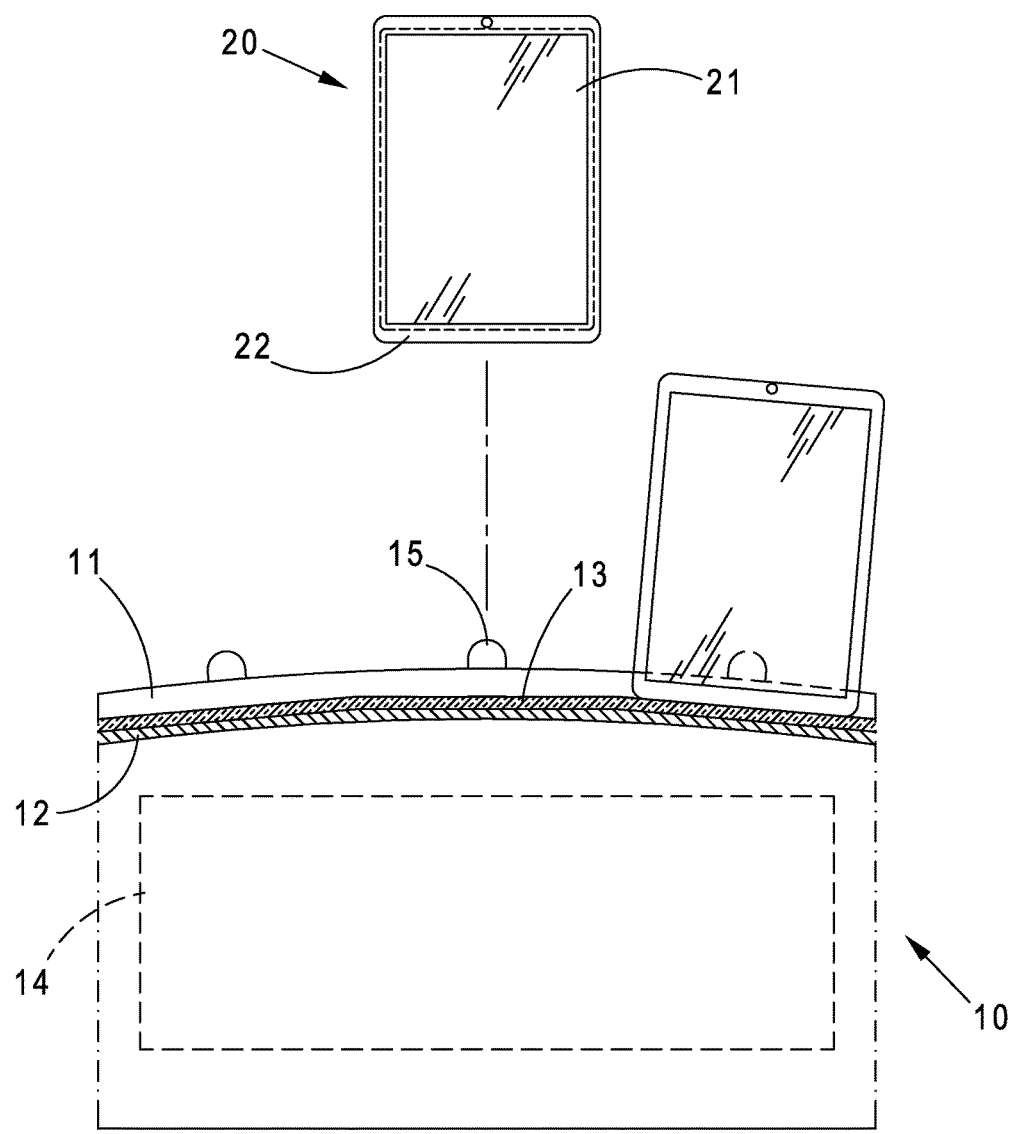
FIG. 1 is a schematic view of a preferred embodiment of the present invention.

Referring to FIG. 1, which is a schematic view of a wishing card binding structure according to the present invention, the wishing card binding structure is mainly constituted by a lighting seat 10 and a plurality of wishing cards 20, where the lighting seat 10 includes a card seat main body 11, control circuit module 14 and a plurality of light emitting diodes (LEDs) 15. The card seat main body 11 is configured with at least one positioning groove 12, the bottom of which a first binding element 13 is configured. The LEDs 15 are configured on the positions of the lighting seat 10 close to the positioning groove 12 and in connection with the control circuit module 14, capable of not only illuminating continuously but being set to carry out light change or positioning indication function.

The wishing card 20 is constituted by a card body 21 and second binding element 22, where the card body 21 is made of transparent or non-transparent plastics, glass, ore, metal, or the like, the surface thereof may further added with text or graphics, thereby being used for blessing and wishing. The second binding element 22 is adapted to be in connection with the first binding element 13, and is a frame in the embodiment for explanation, but it is not so limited. Particularly, the first and second binding elements 13, 22 are a mutually attractive magnet pair such that they may be a combination of a permanent magnet arranged in pair with ferromagnetic metal capable of being attracted thereby, or a combination of two permanent magnets with different magnetism, thereby binding and positioning the wishing card 20 on the card seat main body 11 by means of magnetic attraction.

Figure 2:
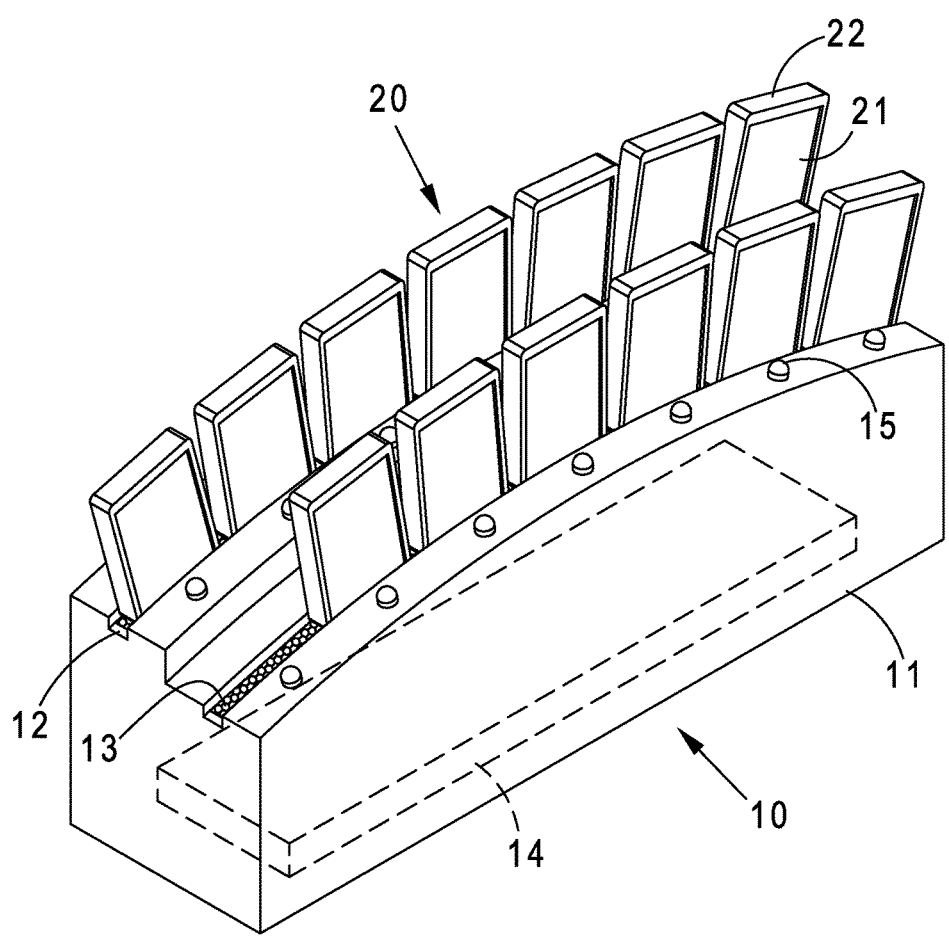
FIG. 2 is a perspective view of the embodiment of the present invention.

Referring to FIG. 2, which illustrates a preferred embodiment for the implementation of the structures mentioned above according to the present invention, it can be clearly seen from the figure that the card seat main body 11 is configured with at least one positioning groove 12, capable of the provision of the placement of at least one wishing card 20, the LED 20 in front of the wishing card 20 being able to light the wishing card 20 in use. Therefore, the design of the wishing card 20 being connected to and positioned on the lighting seat 10 by means of magnetic attraction allows the modeling designs of the lighting seat 10 to be more variable other than the design of a horizontal line, capable of building more vision effects.

Figure 3:
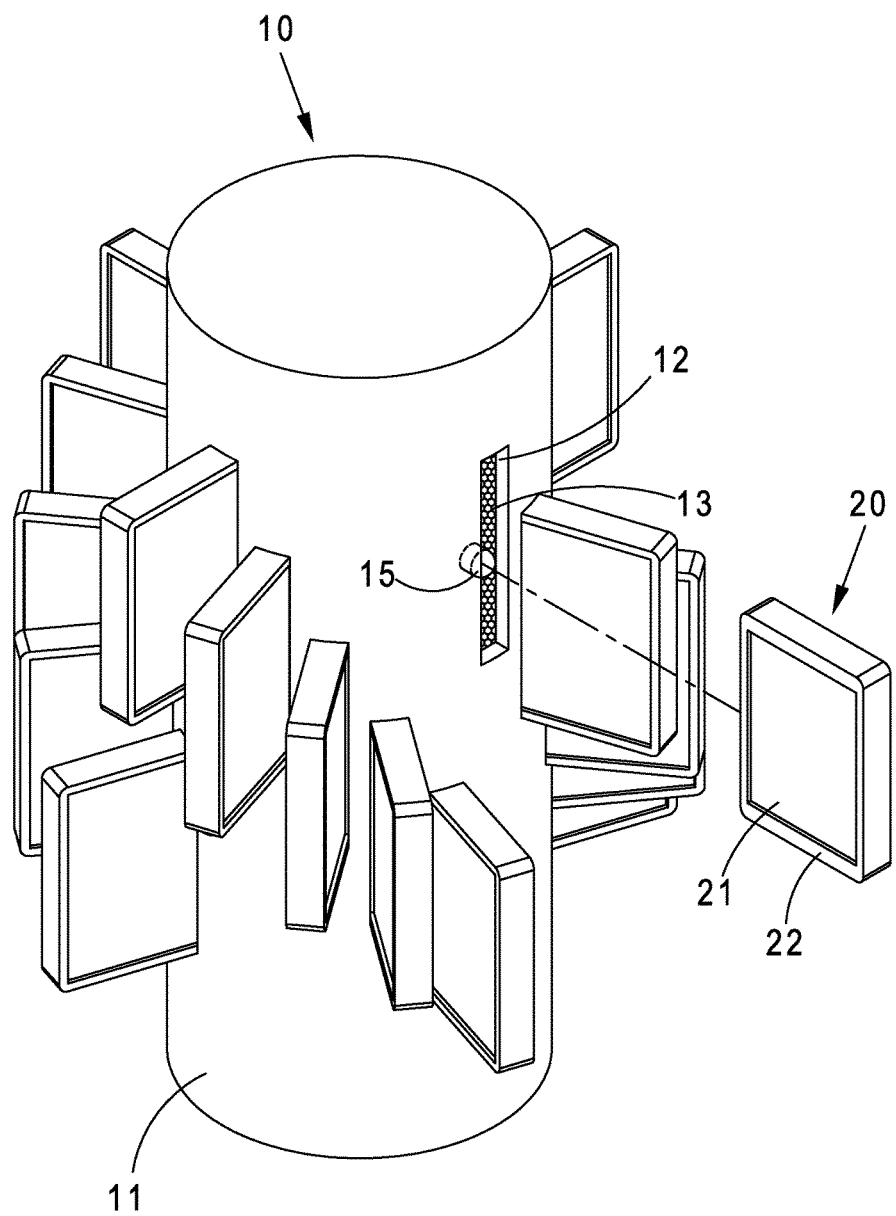
FIG. 3 is a perspective view of another preferred embodiment of the present invention.
Figure 4:
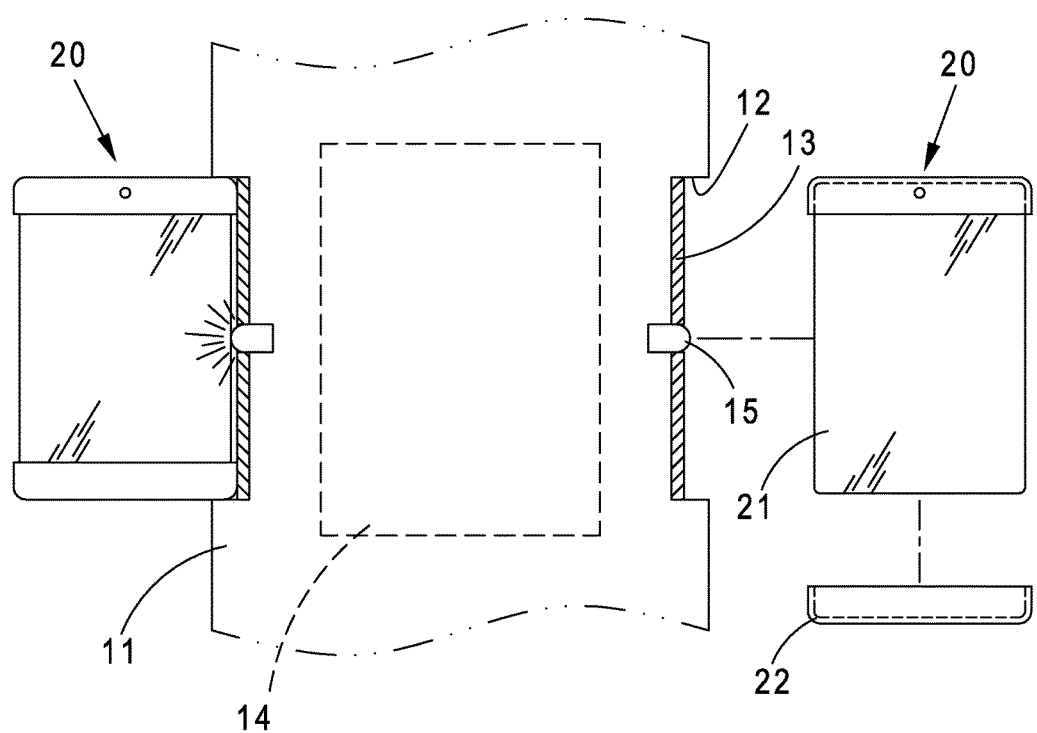
FIG. 4 is a schematically cross-sectional view of the embodiment of the present invention.

Furthermore, referring to FIGS. 3 and 4, which illustrate another embodiment of the present invention, the figures show that the magnetic attraction of the present invention may be arranged laterally; the difference between the present embodiment and the embodiment mentioned above is in that the LED 15 may be configured inside the positioning groove 12 and the second binding element 22 of the wishing card 20 does not block the LED 15 in the present embodiment so that light emitted from the LED 15 will pass through the card body 21 to scatter outward if the card body 21 is made of light penetrable material, forming another lighting effect.

Figure 5:
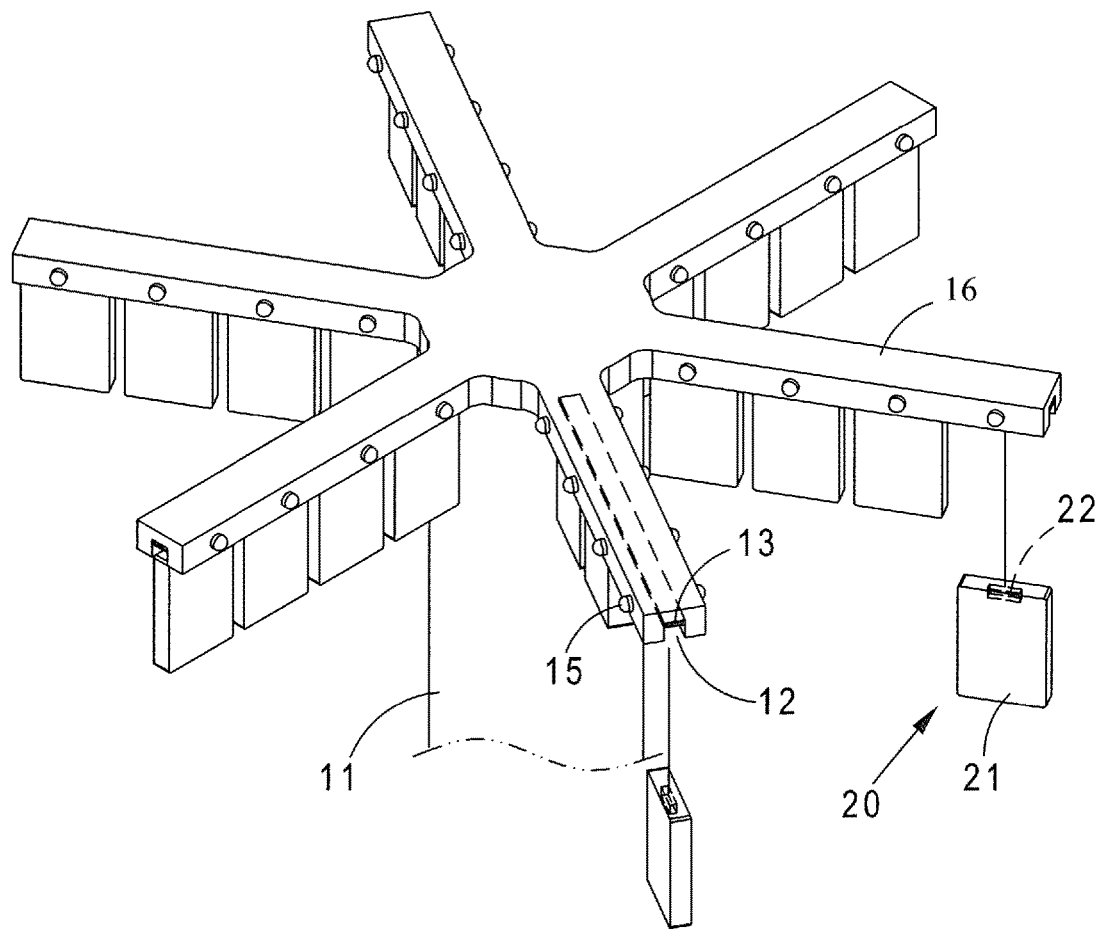
FIG. 5 is a perspective view of still another preferred embodiment of the present invention.

Referring to FIG. 5, which illustrates still another preferred embodiment of the present invention, the figure shows that the card seat main body 11 of the present invention is extended with a plurality of extension arms 16 each configured with the positioning groove 12 and the first binding element 13 positioned on the bottom face of the positioning groove 12; the second binding element 22 of the wishing card 20 is buried in the card body 21, thereby not only having the effect of displaying many wishing cards at the same time, but building a special product feature for the present invention with the placement of the wishing card from bottom to top.

The present invention can carry out the binding of many wishing cards at the same time through the structures mentioned above, and replace conventional simple remarking with the wishing card, making the present invention much more eye-appealing. Particularly, the wishing card can be recycled without wasting, and the magnetic attraction binding allows the modeling designs of the lighting seat to be more flexible, not only occupying no use space, but capable of increasing product selectivity to the wishing card through the designed appearance modeling thereof.

I claim:

1. A wishing card binding structure, comprising:
   a lighting seat, comprising a card seat main body, control circuit module and a plurality of light emitting diodes (LEDs), said card seat main body being configured with at least one positioning groove, a first positioning element being configured inside said positioning groove, and said LEDs being in connection with said control circuit module; and
   a plurality of wishing cards, each thereof being constituted by a card body and second binding element, and said first binding element and second binding element being a magnetic attraction pair capable of attracting each other,
   whereby, said wishing card is attracted to and positioned on any position of said first binding element through said second binding element.

2. The structure according to claim 1, wherein said LED is configured inside said positioning groove.

3. The structure according to claim 1, said second binding elements are bounded to at least one side of said card body.

4. The structure according to claim 1, wherein said second binding element is buried in said card body.

5. The structure according to claim 1, wherein said magnetic attraction pair is a permanent magnet arranged in pair with ferromagnetic metal.

6. The structure according to claim 1, wherein said magnetic attraction pair is two permanent magnets with different magnetism.

\* \* \* \* \*